(12) United States Patent
Lautenschläger et al.

(10) Patent No.: US 6,949,227 B2
(45) Date of Patent: Sep. 27, 2005

(54) DEVICE FOR IMPLEMENTING CHEMICAL REACTIONS AND PROCESSES IN HIGH FREQUENCY FIELDS

(75) Inventors: Werner Lautenschläger, Leutkirch/Allgäu (DE); Bernd Ondruschka, Leipzig (DE); Matthias Nüchter, Leipzig (DE)

(73) Assignee: Milestone S.r.l., Soriole (IT)

( * ) Notice: Subject to any disclaimer, the term of this patent is extended or adjusted under 35 U.S.C. 154(b) by 182 days.

(21) Appl. No.: 09/980,026

(22) PCT Filed: Mar. 27, 2001

(86) PCT No.: PCT/EP01/03482

§ 371 (c)(1),
(2), (4) Date: Mar. 29, 2002

(87) PCT Pub. No.: WO01/72413

PCT Pub. Date: Oct. 4, 2001

(65) Prior Publication Data

US 2002/0176814 A1 Nov. 28, 2002

(30) Foreign Application Priority Data

Mar. 27, 2000 (DE) .......................................... 100 15 794

(51) Int. Cl.[7] ............................................... B01J 19/08
(52) U.S. Cl. .................................................... 422/186
(58) Field of Search ......................... 422/186, 21, 295, 422/302

(56) References Cited

U.S. PATENT DOCUMENTS

| | | | | |
|---|---|---|---|---|
| 5,345,066 A | * | 9/1994 | Knapp et al. ................ | 219/686 |
| 5,427,741 A | | 6/1995 | Bennett ........................ | 422/102 |
| 5,520,886 A | | 5/1996 | Bennett et al. .............. | 422/102 |
| 6,136,276 A | | 10/2000 | Hargett, Jr. et al. ........ | 422/102 |

FOREIGN PATENT DOCUMENTS

| | | |
|---|---|---|
| DE | 19700499 | 12/1996 |
| DE | 0916398 | 3/1997 |

OTHER PUBLICATIONS

English translation of the International Search Report for Application No. PCT/EP01/03482, filed Mar. 27, 2001.

* cited by examiner

*Primary Examiner*—Kishor Mayekar
(74) *Attorney, Agent, or Firm*—Marshall, Gerstein & Borun LLP

(57) ABSTRACT

A devise for carrying out chemical reactions and processes in high-frequency fields, comprises a high-frequency chamber 2 for irradiating a solid, liquid or gaseous substance while under pressure with at least one radiation source and a reactor for exposing to a high-frequency field. The reactor being connectively coupled to the upper wall 4 of the high-frequency chamber 2 through a sealable connection 3. Rail elements 5 are provided around the reactor, and configured to form a pressure-resistant cage. The rail elements 5 each have a guide 11 for holding a crown-shaped holder 12. The holder 12 is fixed in its position by the guides 11 of the rail elements 5. Multiple reaction chambers can be incorporated as a batch reactor system.

19 Claims, 3 Drawing Sheets

DEVICE FOR IMPLEMENTING CHEMICAL REACTIONS AND PROCESSES IN HIGH FREQUENCY FIELDS

This application is a 35 U.S.C 371 National Stage application of PCT/EP01/03482 filed Mar. 27, 2001.

TECHNICAL FIELD

The invention concerns a device for implementing chemical reactions and processes in high-frequency fields. This device permits advantageously the introduction of energy into dissolution, hydrolysis, chemical synthesis, extraction, distillation, drying as well as other reactions and processes.

BACKGROUND

Frequently, energy input is necessary for the progress, acceleration and/or initiation of chemical reactions and processes. For this purpose, for example, the reaction mixtures are arranged in microwave-permeable reaction containers in a microwave system with a radiation-screened housing and energy is introduced by irradiation with microwaves. Since, in the reactions and processes that occur, frequently high pressures are produced or the reactions proceed only under pressure, the entire arrangement must be pressure-resistant and, for example, must be able to be closed with a cover system. In general, the reaction containers are also equipped with safety equipment and control devices in order to be able to monitor the progress of the chemical reactions and processes.

Such a device is known, for example, from DE 4 018 955 A1. Among others, a microwave furnace for heating sample material with several pressure-resistant sample containers is described there and the sample containers are arranged on a rotatable carrier part with appropriate holders for the sample containers. In this way, several samples can be treated simultaneously, and, as a result of that, a higher sample throughput can be achieved. A disadvantage is that several pressure-resistant sample containers are needed which can be expensive and thus cost-intensive depending on the design. Furthermore, the reaction volume is limited and, as a rule, pressure and temperature is measured only in one container, as a result of which the possibilities of application are limited and identical reactions cannot be produced in each individual container because of the inhomogeneities of the microwave field.

In DE 197 00 499 A1 and in DE 197 48 520 A1, microwave reactor systems are described with a large pressure-resistant holding container in which one or several sampleholders can be arranged in a relatively simple but not necessarily pressure-resistant construction. The disadvantage of this system is the expensive and complicated mounting of the reactor in the microwave oven, the low flexibility, the limited volume and the high expenditure needed for setting up the system.

Therefore, the task of the invention is to create a device which is suitable for different applications for carrying out chemical reactions and processes in high-frequency fields with high reliability and minimum energy losses, as well as with as little expenditure as possible.

BRIEF SUMMARY

This task of the invention is solved by providing individual rod or rod-like elements in the high-frequency chamber, and these elements can be attached to the wall of the high-frequency chamber, preferably on the cover of the high-frequency chamber, and form a pressure-resistant cage around the reactor with the analysis material or reagent. This cage for achieving the pressure resistance of the device, which is always required, reduces the high-frequency losses only minimally (depending on the design of the cage), so that, in comparison to the known irradiation devices, a high degree of efficiency is achieved. With the attachment (formation of the positive and nonpositive engagement to the high-frequency chamber or to its cover), at the same time a holder for the reactor is fixed in position, preferably by clamping. In this way, the device can be adapted by suitable selection of the rod-like elements, especially with regard to their number, shape, dimension and material, with a very small economical and operational expenditure, for universal application in the most varied tasks of use (depending on the required pressure-resistance and stability, irradiation treatment, cage-related irradiation losses, among others) and can be equipped and re-equipped within a very short time.

The possibility that this cage can be realized as a component of a modular system because of its selectable structural design, its individual components, for example, the reactor design (choice of the shape of the reactor, reactor size and principle of operation) as well as the securing of the cover (closing the high-frequency chamber) can be selected for the desired application, mounted and altered with a minimum expenditure.

In the Subclaims, the related advantageous design characteristics of the invention are given. Thus, with very simple handling, it is possible to introduce the reactor from the top into the high-frequency chamber and, with this introduction, by securing the cover at the same time, the said pressure-stable cage can be fixed around the reactor as well as above it, as well as with clamping and other holders, the reactor can also be fixed in its position and stabilized in a self-centering and flush manner. Moreover, when closing the cover, the high-frequency chamber is sealed so that it is radiation-safe. This very simple handling expenditure is also true for disassembling and re-equipping (for example, as a flow-through device or for realizing an additional reaction treatment of the material that is being reacted, such as introduction of gas, aeration, among others).

For this purpose, it is also advantageous when, as a component of the said modular system, a separable upper (preferably connected to the cover of the high-frequency chamber) reaction closure can be provided as well as a replaceable lower reactor closure. For an application-specific mounting of the device, or in the case of a required re-equipping, in this way, an advantageous modular cover, which is provided, can be used for the selected reactor with an upper reactor closure with a pass, as well as a corresponding holding and fixing of the reactor according to the invention with an effective lower reactor closure.

The invention can be used for batch and flow-through processes and the reactors can be designed both as an individual reactors or as multiple reactor systems with multiple reaction chambers.

BRIEF DESCRIPTION OF THE DRAWINGS

The invention will be explained below in more detail with the aid of practical examples shown in the drawing.

The following are shown.

DETAILED DESCRIPTION

Figure 1:
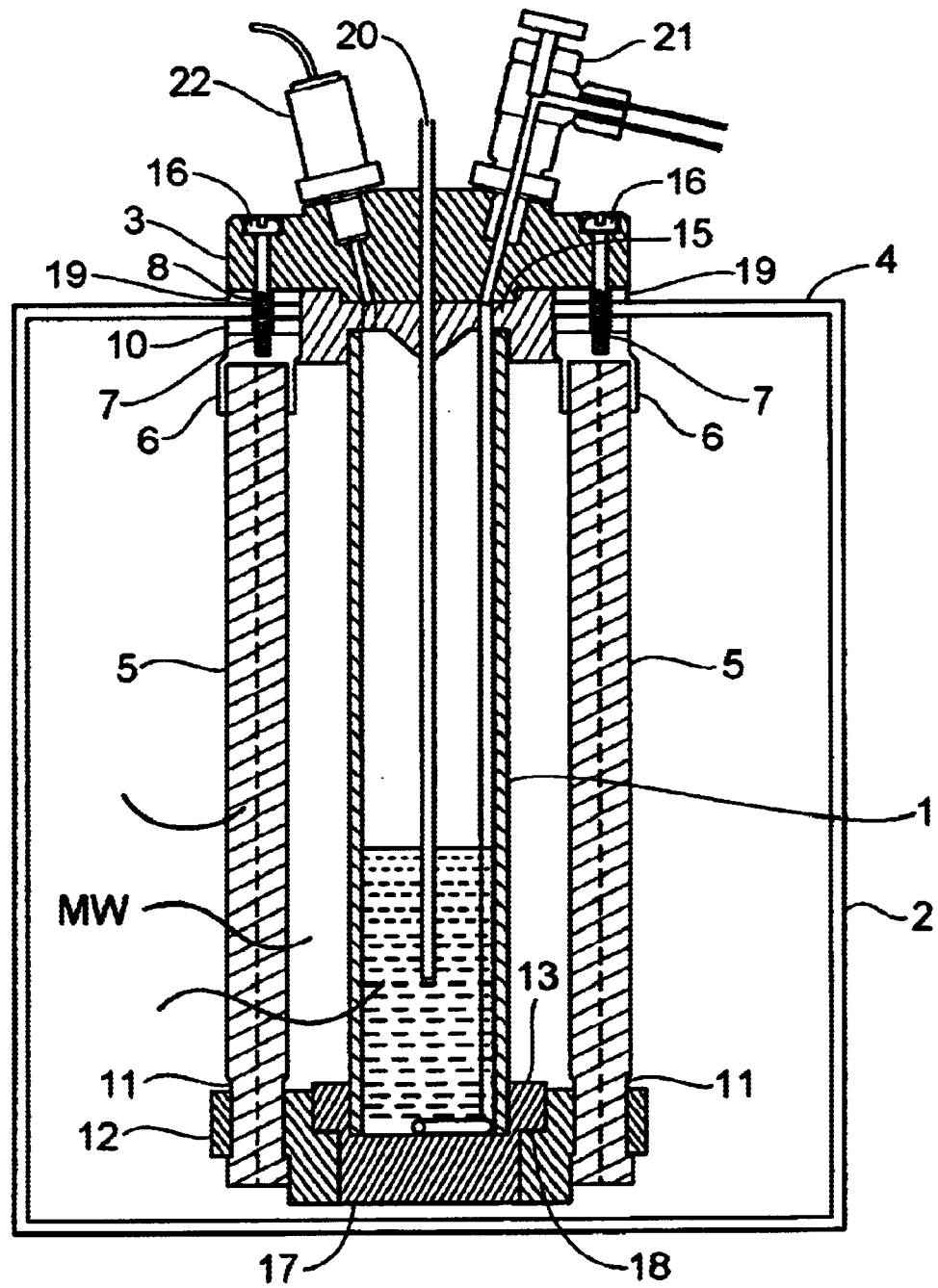
FIG. 1: Cross-sectional representation of a mounted device with structure and fixing of the pressure-resistant cage around the reactor located in the high-frequency chamber.

FIG. 1 shows a schematic illustration of the device according to the invention in which a reactor 1 is mounted in a high-frequency chamber 2 and is secured through a cover 3 with a screw connection on an upper wall 4 of the high-frequency chamber 2. Rod-like elements 5 are arranged around the reactor 1, which can be secured individually on the upper wall 4 through fixing adapter 6 arranged at the upper end of the rod-like elements 5. For this purpose, each fixing adapter 6 has an upper front threaded bore 7, with which the fixing adapter 6 can be screwed into bores 8 of the upper wall 4 and can be separated again. In the simplest case, each rod-like element 5 can also be screwed in directly to the upper wall 4 without additional fixing adapter 6, for example, a threaded bore on its front side, not shown in the drawing.

Bores 8 are arranged circularly around an opening 9 (see FIG. 2) in the upper wall 4 through which reactor 1 can be introduced into the high-frequency chamber 2 for radiation treatment and then can be removed from it again. In its positive and nonpositive attachment to the upper wall 4, the rod-like elements 5 form a pressure-resistant cage around reactor 1, which have only a minimum adverse influence on the high-frequency radiation used for the radiation treatment of reactor 1, in comparison to a known pressure-resistant protective mantle (in FIG. 1, the microwaves MW are shown symbolically by wavy lines). As a result of this, comparatively, a relatively high electrical efficiency of the device is achieved. The rod-like elements can be fixed individually so that the pressure-resistant cage around reactor 1 can be rebuilt and re-equipped, depending on the purpose of application and application requirements. The realization of this cage can therefore be determined and altered any time regarding the use of the rod-like elements 5 (especially shape, dimension and material) as well as regarding the choice of the number of elements. Depending on the distance and dimensions, plastics, ceramic materials and metals come into consideration as material for the rod-like elements 5 in order to adjust them to the high temperatures, pressure and high-frequency exposure.

Using an annular flange 10 between the upper wall 4 and the fixing adapter 6, the positive and nonpositive engagement of the rod-like elements 5 can be reinforced.

Figure 4:
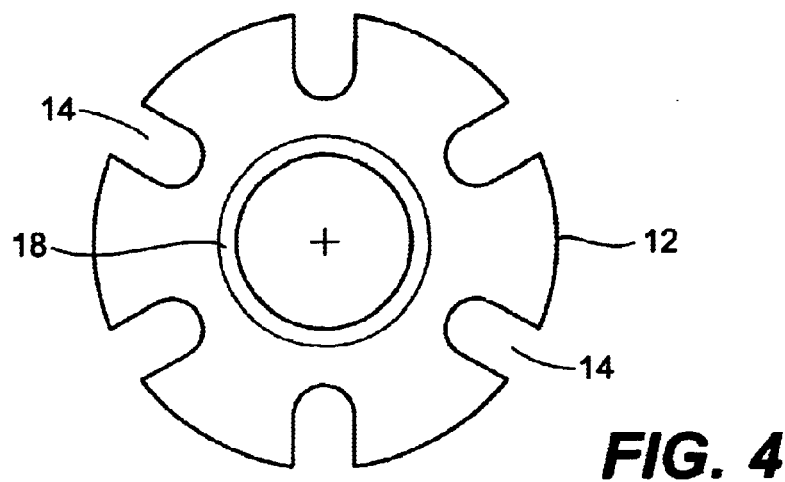
FIG. 4: Crown-shaped holder for fixing the reactor in the lower position (top view).

In the lower region, each rod-like element 5 has a guide 11 for accepting a crown-shaped holder 12 for reactor 1 or for a lower reactor closure 13. These guides 11 can consist, for example, of narrowing of the material not reaching to the lower end of the rod-like elements 5, into which grooves 14 enter, preferably in a u-shape, formed at the edge of the crown-shaped holder 12 (see FIG. 4) but their design is not limited to the above.

The great advantage of this special structural design is that, in order to mount the device, the crown-shaped holder 12 with its grooves 14 merely has to be introduced into the guides 11 of the rod-like elements 5, and, in the manufacture of the positive and nonpositive attachment of the rod-like elements 5, their position is arrested in a pressure-stable manner by centering and flush self-clamping. In this way, all that has to be done is to fix the rod-like elements 5 with their upper end in bores 8 of the upper wall 4, and then the crown-shaped holder 12 is fixed in its position automatically in the lower region of the rod-like elements 5. In the reverse case, the crown-shaped holder 12 is separated simultaneously with the loosening of the rod-like elements 5 from their position fixed by the holder. The fixing of the rod-like elements 5 is done by screw-connection, as shown in FIG. 1. However, fundamentally, here other connections can also be used, which are not shown in the drawing, such as clamps, bayonet-like closures, etc., which make a separable pressure-stable positive and nonpositive attachment of the rod-like elements 5 possible.

Figure 2:
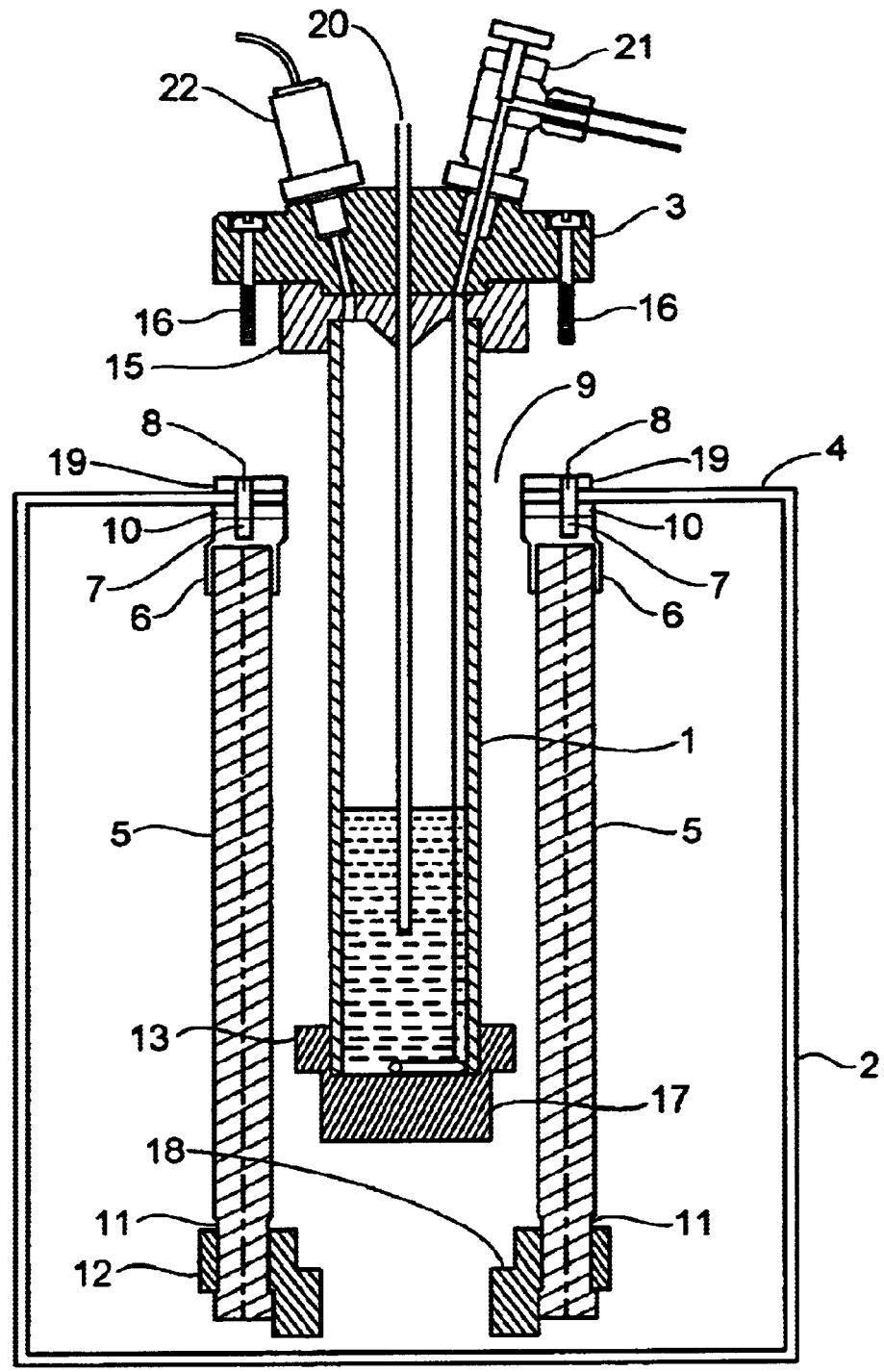
FIG. 2: Cross-section of the device according to FIG. 1, for the introduction and removal of the reactor into or out of the high-frequency chamber.

The reactor unit, consisting of reactor 1, the lower reactor closure 13, an upper reactor closure 15 as well as cover 3, can be introduced into the high-frequency chamber 2 from the top through opening 9 (see FIG. 2).

The cover 3 has screw connections 16 corresponding in position to the bores 8 of the upper wall 4, through which, in the same handling, both the cover 3 itself, for radiation-safe screening of the high-frequency chamber 2, as well as the pressure-resistant cage consisting of the rod-like elements 5, can be secured and mounted. At the same time, as described above, with this fixing, the crown-shaped holder 12 takes up the lower reactor closure 13 for fixing the position of reactor 1. The rod-like elements 5, which are connected to the cover 3 by screwing on the upper wall 4 of the high-frequency chamber 2 through annular flange 10, ensure the closure of the high-frequency chamber 2 as a tight Faraday cage, prevent opening of the cover by lifting when the pressure develops in the high-frequency chamber 2, and thus make it possible to carry out reactions at elevated pressure (for example, up to 400 bar), depending on the material and size of the high-frequency chamber 2.

The described individual elements of the reactor unit and of the pressure-resistant cage surrounding the reactor 1 as well as cover 3 for the high-frequency chamber 2 can also be provided expediently as components of a modular system.

In order to make different reactor applications possible, only slight adaptations need to be made on reactor I as well as on the lower and upper reactor closures 13, 15. The pressure-resistant cage can also be varied by selection of suitable rod-like elements 5 while maintaining the principle of fixing, and can be adapted to the particular process and reaction conditions.

For holding of the lower reactor closure 13 in holder 12 more stably in position, this has a cylinder flange 17 on the bottom as guide element, which engages into a cylinder groove 18 of holder 12 when the device is mounted. The design of these guide elements between holder 12 and the lower reactor closures 13, is nevertheless not limited to the characteristics shown here. Other guide elements, such as pegs, bores and conical holding elements, etc., may be used.

Furthermore, the mounting of the rod-like elements 5, especially for the purpose of rapid and low-cost equipping or change of configuration of the device can be facilitated by additional stop elements, for example, an annular flange 19, where this can be designed at the same time as a guide element for cover 3 and the upper reactor closure 15 and finally also contributes to the stability of the attachment.

Figure 3:
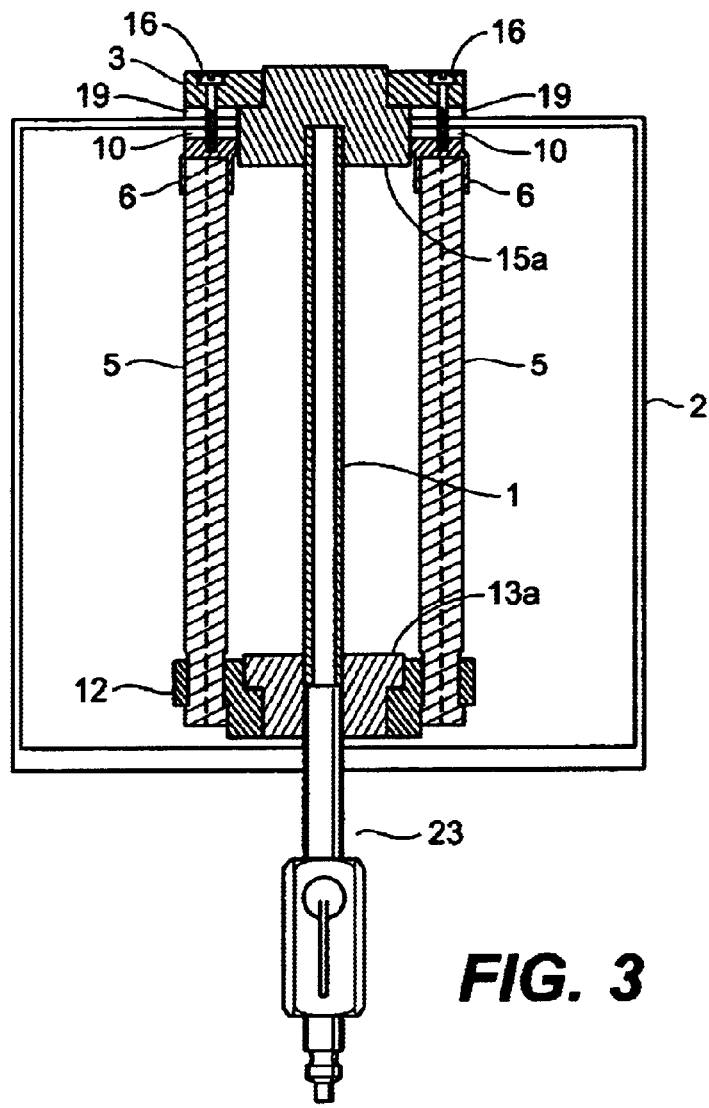
FIG. 3: Cross-sectional representation of a device with configuration for flow-through reactions.

FIG. 3 shows an embodiment of the device as a flow-through reactor. For this purpose, here the lower reactor closures 13 are replaced by a reactor closure 13a into which an inlet tube 23 with valve opening and the upper reactor closure 15 is replaced by a reactor closure 15a. With such a low-cost replacement, while keeping the pressure-stable cage function produced by the rod-like elements 5, rapid and uncomplicated re-equipping between batch and flow reactor is possible. In these cases, it is expedient, when, as shown in FIGS. 1–3, the upper reactor closure 15, 15a is connected in a fixed manner with cover 3 and is provided as a common structural unit of the modular system for mounting and re-equipping. The entire reactor unit, consisting of a tubular reactor 1, cover 3 with the upper reactor closure 15 as well as with the lower reactor closure 13, can then be introduced into the high-frequency chamber 2 as already described and shown in FIG. 2 with a few handling steps and can be taken out of it again for easy dismounting or re-equipping. In the dismounted state, with the removal of the reactor unit, the pressure-resistant cage, which is also mounted and separated from the upper wall 4, can be dismounted and similarly re-equipped. Upon (re)introduction of the reactor unit, the entire device (reactor unit and cage) needs to be attached only through screws 16, centering and stabilizing its flushing position and sealed for radiation safety.

For different purposes of application, it is possible to introduce into reactor 1, through cover 3 and the upper reactor closure 15, additional means for carrying out the reactions and processes described at the outset, such as one or more temperature-measuring probes 20, a gas inlet system 21 as well as infrared probes, cooling devices, mechanical stirrers, samplers, which are not shown in the drawing for the sake of clarity, and can be replaced again. The optional coupling of other equipment through corresponding bores in cover 3 as well as in the upper reactor closure 15 is possible and can be varied; for example, one or several pressure-measuring probes 22 and/or gas inlets and outlets, as well as safety devices, for example, pressure-release valves or burst disks can be applied or connected; these are not shown in the drawing either, for the sake of clarity. Thus, reactor 1 can be used universally by selection of suitable modular reactor parts (cover 3 with the upper reactor closure 15) and can be constructed or re-quipped very specifically for the application. Here, tubular reactors 1 represent a cost-effective and extremely flexible constructional solution for the reaction container, and this makes it possible to use the most varied materials, such as glass, quartz, ceramics and plastics. These materials are available in numerous sizes and designs in a cost-effective manner.

The invention is not limited to the individual reactor designs but can also be realized in multireactor systems, for example, reactor inserts with multiple reaction chambers. Furthermore, the type of attachment of cover 3 and the rod-like elements 5 is not limited to the screw connection shown in the drawing.

List of reference numbers used

1—reactor
2—high-frequency chamber
3—cover
4—upper half of the high-frequency chamber
5—rod-like element
6—fixing adapter
7—threaded bore
8—bore
9—opening
10,19—annular flange
11—guide
12—crown-shaped holder
13,13a—lower reactor closure
14—groove
15,15a—upper reactor closure
16—screw connection
17—cylinder fange
18—cylinder groove
20—temperature-measuring probe
21—gas inlet system
22—pressure-measuring probe
23—inlet tube with valve
MW—microwaves

What is claimed is:

1. Device for carrying out chemical reactions and processes in high-frequency fields, comprising:
a high-frequency chamber for irradiating with at least one radiation source; and
a reactor with a closeable cover, the reactor for exposing to a high-frequency field, the reactor being connectively coupled to an upper wall of the high-frequency chamber through a separable positive and nonpositive engagement connection, the reactor for containing a solid, liquid and/or gaseous substance or substance mixtures to be investigated or to be treated in a pressure-resistant surroundings, wherein rod elements are provided around the reactor, and configured to form a pressure-resistant cage, which are constructed to fasten to the upper wall of the high-frequency chamber in a positive manner of engagement to secure them through one or more fixing elements, wherein each of the rod elements has a guide for holding a crown-shaped holder where the holder is constructed to be fixed in its position by the separable positive and nonpositive engagement connection of the rod elements.

2. Device according to claim 1, wherein the rod elements are cylindrical, wherein the guide comprises a narrowing of the diameter which does not reach to the end of the rod element and that the holder preferably has u-shaped grooves which correspond in their position with each of the guides of the rod elements.

3. Device according to claim 1, wherein the one or more fixing elements each comprise a fixing adapter with a threaded bore on a face, with which the rod elements can be secured as well as separated with the aid of screw connections on bores in the upper wall and on the cover of the high-frequency chamber.

4. Device according to claim 3, wherein the cover of the reactor has screw connections corresponding with the position of the bores of the upper wall of the high-frequency chamber as well as with the threaded bores of the rod elements or their fixing adapter, wherein, when the cover is secured to the upper wall of the high-frequency chamber and the crown-shaped holder is correspondingly fixed in position by the guides of the rod elements, the high-frequency chamber is closed so that it is tight to microwaves.

5. Device according to claim 3, wherein the fixing elements further comprise an annular flange through which the rod elements are secured.

6. Device according to claim 1, wherein the one or more fixing elements comprise a threaded bore on a face, provided directly in the rod elements, through which the rod elements can be secured on or separated from bores with the aid of screw connections in the upper wall and in the cover of the high-frequency chamber.

7. Device according to claim 6, wherein the fixing elements further comprise an annular flange through which the rod elements are secured.

8. Device according to claim 6, wherein the fixing elements further comprise an annular flange through which the rod elements are secured.

9. Device according to claim 1, wherein the reactor has an upper reactor closure, which is connected to the cover and, together with this, can be separated from the reactor.

10. Device according to claim 1, wherein the reactor has a lower reactor closure, which can be separated from the reactor and is provided for holding the crown-shaped holder.

11. Device according to claim 10, wherein the crown-shaped holder and/or the lower reactor closure have guide elements for the purpose of fixing the position of the reactor.

12. Device according to claim 11, wherein the guide elements comprise a cylinder groove and a cylinder flange engaging the cylinder groove.

13. Device according to claim 1, wherein stop elements are provided which facilitate the positive and nonpositive engagement of the rod elements on the upper wall of the high-frequency chamber, wherein the stop elements facilitate rapid and low-cost mounting or changing of the configuration of the device.

14. Device according to claim 13, wherein the stop elements comprise an annular flange.

15. Device according to claim 14, wherein the annular flange is designed at the same time as a guide element for the cover and the upper reactor closure.

16. Device according to claim 1, wherein the device is built as a single reactor system.

17. Device according to claim 1, wherein, as a multiple reactor system, the device is provided with multiple reaction chambers, each of the multiple reaction chambers for holding an insert.

18. Device according to claim 1, wherein the reactor or the a set of multiple reaction chambers are designed as a batch reactor system.

19. Device according to claim 1, wherein the reactor or a set of multiple reaction chambers are designed as a flow-through reactor system.

* * * * *